US012518161B2

(12) United States Patent
Wu et al.

(10) Patent No.: US 12,518,161 B2
(45) Date of Patent: Jan. 6, 2026

(54) METHOD AND APPARATUS FOR PERFORMING DISTRIBUTED TRAINING ON DEEP LEARNING MODEL, DEVICE AND STORAGE MEDIUM

(71) Applicant: Beijing Baidu Netcom Science Technology Co., Ltd., Beijing (CN)

(72) Inventors: Zhihua Wu, Beijing (CN); Dianhai Yu, Beijing (CN); Yulong Ao, Beijing (CN); Weibao Gong, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 752 days.

(21) Appl. No.: 17/880,070

(22) Filed: Aug. 3, 2022

(65) Prior Publication Data
US 2022/0374713 A1 Nov. 24, 2022

(30) Foreign Application Priority Data
Oct. 28, 2021 (CN) .......................... 202111264469.2

(51) Int. Cl.
*G06N 3/08* (2023.01)
*G06F 9/50* (2006.01)
*G06N 3/098* (2023.01)

(52) U.S. Cl.
CPC ............. *G06N 3/08* (2013.01); *G06F 9/5044* (2013.01); *G06F 9/5066* (2013.01); *G06N 3/098* (2023.01);
(Continued)

(58) Field of Classification Search
None
See application file for complete search history.

(56) References Cited

U.S. PATENT DOCUMENTS 7,552,098 B1 6/2009 Haffner
11,546,780 B2 * 1/2023 Bellamkonda ........ H04W 24/02
(Continued)

FOREIGN PATENT DOCUMENTS

CN 109754060 A 5/2019
CN 110889492 A 3/2020
(Continued)

OTHER PUBLICATIONS

V. -Q. Nguyen, S. -N. Nguyen, D. Choi and K. Kim, "Location-aware dynamic network provisioning," 2017 19th Asia-Pacific Network Operations and Management Symposium (APNOMS), Seoul, Korea (South), 2017, pp. 239-242 (Year: 2017).*

(Continued)

*Primary Examiner* — Frank D Mills
(74) *Attorney, Agent, or Firm* — Knobbe, Martens, Olson & Bear, LLP

(57) ABSTRACT

The present disclosure provides a method and apparatus for performing distributed training on a deep learning model. The method may include: generating a distributed computation view based on data information of a to-be-trained deep learning model; generating a cluster resource view based on property information of a cluster hardware resource corresponding to the to-be-trained deep learning model; determining a target segmentation strategy of a distributed training task based on the distributed computation view and the cluster resource view; and performing distributed training on the to-be-trained deep learning model based on the target segmentation strategy.

17 Claims, 4 Drawing Sheets

(52) U.S. Cl.
CPC .. *G06F 2209/501* (2013.01); *G06F 2209/505* (2013.01)

(56) References Cited

U.S. PATENT DOCUMENTS

| | | | |
|---|---|---|---|
| 11,736,559 B2* | 8/2023 | Nair | H04L 67/02 709/223 |
| 2018/0336458 A1* | 11/2018 | Tomioka | G06N 3/08 |
| 2019/0114537 A1* | 4/2019 | Wesolowski | G06N 3/084 |
| 2019/0332422 A1* | 10/2019 | Liu | G06F 9/4881 |
| 2019/0377606 A1* | 12/2019 | Feng | G06F 9/5044 |
| 2020/0174840 A1 | 6/2020 | Zhao et al. | |
| 2020/0193964 A1 | 6/2020 | Li et al. | |
| 2020/0342322 A1* | 10/2020 | Han | G06N 3/10 |
| 2021/0158147 A1 | 5/2021 | Vinod et al. | |

FOREIGN PATENT DOCUMENTS

| | | |
|---|---|---|
| CN | 113128702 A | 7/2021 |
| CN | 113449857 A | 8/2021 |
| JP | 2008-123205 A | 5/2008 |
| JP | 2015-167041 A | 9/2015 |
| JP | 2020-518065 A | 6/2020 |

OTHER PUBLICATIONS

Chinese Office Action for Application No. 202111264469.2, dated Mar. 8, 2022, 14 pages.

Guo, Bin et al., "Context-aware adaptation of deep learning models for IoT devices," Scientia Sinica Informationis, vol. 50, No. 11:1629-1644. Published Nov. 9, 2020, 18 pages.

* cited by examiner

METHOD AND APPARATUS FOR PERFORMING DISTRIBUTED TRAINING ON DEEP LEARNING MODEL, DEVICE AND STORAGE MEDIUM

This patent application claims the priority of Chinese Patent Application No. 202111264469.2, filed on Oct. 28, 2021, and entitled "Method and Apparatus for Performing Distributed Training on Deep Learning Model, Device and Storage Medium", the entire content of which is herein incorporated by reference.

TECHNICAL FIELD

The present disclosure relates to the field of artificial intelligence technology, specifically to the fields of deep learning and cloud computing technologies, and particularly to a method and apparatus for performing distributed training on a deep learning model, a device and a storage medium.

BACKGROUND

In recent years, in order to pursue a better effect, the model in the field of computer vision, the field of natural language processing, the field of personalized recommendation and other fields generally adopt a larger scale of model parameters or a larger scale of training data during model training, for example, a VIT-G/14 vision model having 2 billions of parameters, a GPT3 language model with a scale of 100 billions of parameters, and a click-through rate estimation model with a scale of 1 trillion of parameters and a scale of a hundred millions of data. Therefore, distributed training, as a necessary means for efficient training on an oversized model, has been applied more and more widely.

SUMMARY

The present disclosure provides a method and apparatus for performing distributed training on a deep learning model, a device and a storage medium.

According to a first aspect of the present disclosure, a method for performing distributed training on a deep learning model is provided. The method includes: generating a distributed computation view based on data information of a to-be-trained deep learning model; generating a cluster resource view based on property information of a cluster hardware resource corresponding to the to-be-trained deep learning model; determining a target segmentation strategy of a distributed training task based on the distributed computation view and the cluster resource view; and performing distributed training on the to-be-trained deep learning model based on the target segmentation strategy.

According to a second aspect of the present disclosure, an apparatus for performing distributed training on a deep learning model is provided. The apparatus includes: a first generating module, configured to generate a distributed computation view based on data information of a to-be-trained deep learning model; a second generating module, configured to generate a cluster resource view based on property information of a cluster hardware resource corresponding to the to-be-trained deep learning model; a determining module, configured to determine a target segmentation strategy of a distributed training task based on the distributed computation view and the cluster resource view; and a training module, configured to perform distributed training on the to-be-trained deep learning model based on the target segmentation strategy.

According to a third aspect of the present disclosure, an electronic device is provided. The electronic device includes: at least one processor; and a memory, communicatively connected with the at least one processor. The memory stores an instruction executable by the at least one processor, and the instruction when executed by the at least one processor, causes the at least one processor to perform the method as described in any implementation according to the first aspect.

According to a fourth aspect of the present disclosure, a non-transitory computer readable storage medium storing a computer instruction is provided. The computer instruction is used to cause a computer to perform the method as described in any implementation according to the first aspect.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure.

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
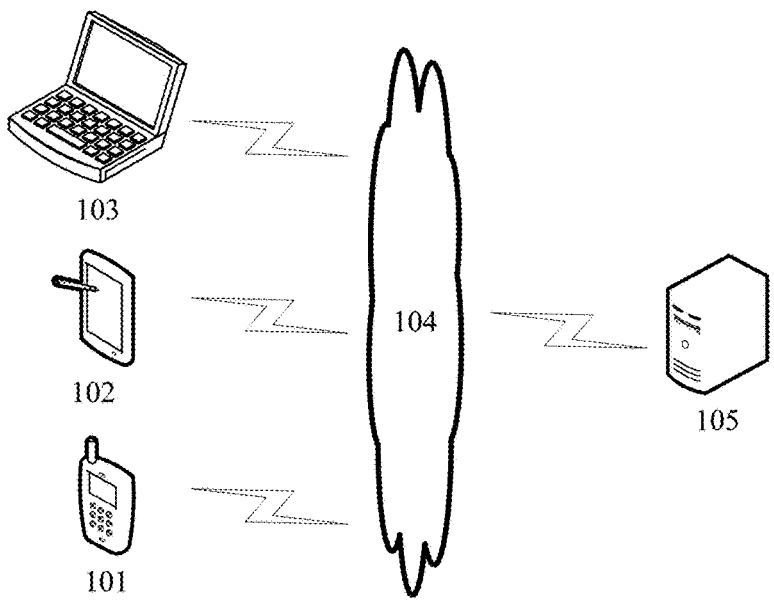
FIG. 1 is a diagram of an exemplary system architecture in which embodiments of the present disclosure may be applied.

FIG. 1 illustrates an exemplary system architecture 100 in which a method for performing distributed training on a deep learning model or an apparatus for performing distributed training on a deep learning model according to embodiments of the present disclosure may be applied.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104 to receive or send a message, etc. Various communication client applications may be installed on the terminal devices 101, 102 and 103.

The terminal devices 101, 102 and 103 may be hardware or software. When being the hardware, the terminal devices 101, 102 and 103 may be various electronic devices, the electronic devices including, but not limited to, a smartphone, a tablet computer, a laptop portable computer, a desktop computer, etc. When being the software, the terminal devices 101, 102 and 103 may be installed in the above listed electronic devices. The terminal devices may be implemented as a plurality of pieces of software or a plurality of software modules, or as a single piece of software or a single software module, which will not be specifically limited here.

The server 105 may provide various services. For example, the server 105 may analyze and process data information of a to-be-trained deep learning model and property information of a cluster hardware resource that are acquired from the terminal devices 101, 102 and 103, and generate a processing result (e.g., a target segmentation strategy).

It should be noted that the server 105 may be hardware or software. When being the hardware, the server 105 may be implemented as a distributed server cluster composed of a plurality of servers, or as a single server. When being the software, the server 105 may be implemented as a plurality of pieces of software or a plurality of software modules (e.g., software or software modules for providing a distributed service), or as a single piece of software or a single software module, which will not be specifically limited here.

It should be noted that the method for performing distributed training on a deep learning model provided by the embodiments of the present disclosure is generally performed by the server 105. Correspondingly, the apparatus for performing distributed training on a deep learning model is generally provided in the server 105.

It should be appreciated that the numbers of the terminal devices, the networks, and the servers in FIG. 1 are merely illustrative. Any number of terminal devices, networks, and servers may be provided based on actual requirements.

Figure 2:
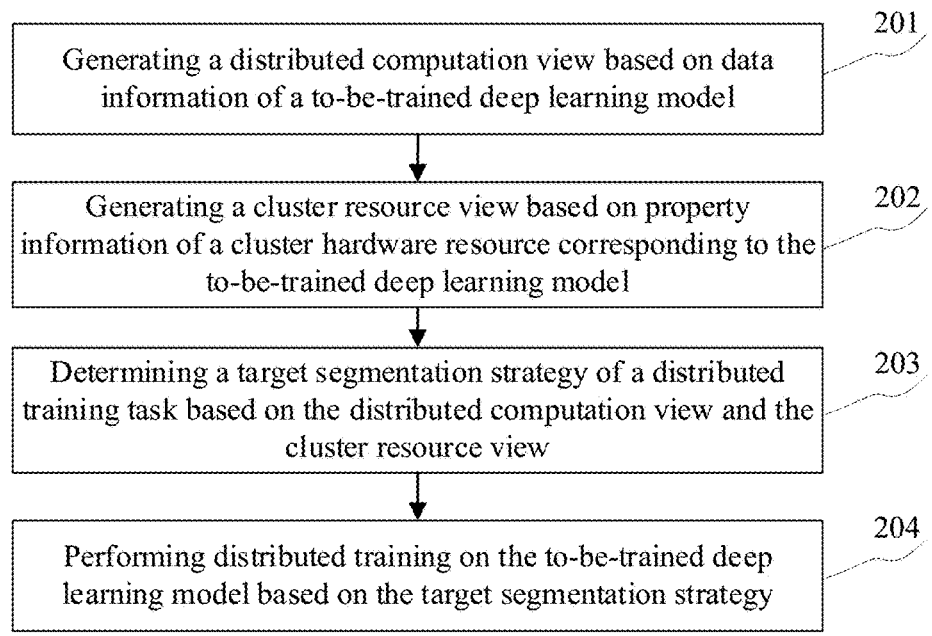
FIG. 2 is a flowchart of a method for performing distributed training on a deep learning model according to an embodiment of the present disclosure.

Further referring to FIG. 2, FIG. 2 illustrates a flow 200 of an embodiment of a method for performing distributed training on a deep learning model according to the present disclosure. The method for performing distributed training on a deep learning model includes the following steps.

Step 201, generating a distributed computation view based on data information of a to-be-trained deep learning model.

In this embodiment, an executing body (e.g., the server 105 shown in FIG. 1) of the method for performing distributed training on a deep learning model may generate the distributed computation view based on the data information of the to-be-trained deep learning model. The to-be-trained deep learning model is the deep learning model that requires distributed training in this embodiment. The above executing body may acquire the data information of the to-be-trained deep learning model, and generate the distributed computation view based on the data information.

The process of training the deep learning model (neural network) can be described as the process of computing a data-flow graph, and the data-flow graph or computation graph is composed of nodes and edges. Here, the computation at a node is called an operator, and each edge represents a tensor transferred between nodes. Therefore, in some embodiments, the above executing body first acquires the operator and tensor of the to-be-trained deep learning model, and then generate the distributed computation view based on the acquired operator and tensor.

Alternatively, each operator and tensor can carry their respective distributed property, and the above executing body may further acquire the distributed properties of the operator and tensor. Here, the distributed properties include, but not limited to, logical process topology information, segmentation mapping information of each dimension of the tensor, slice size information of the each dimension of the tensor, and slice physical device placement information. It should be noted that the distributed property of a tensor may be different from the distributed property corresponding to the operator using the tensor, which is conducive to the separation of storage from computation.

Step 202, generating a cluster resource view based on property information of a cluster hardware resource corresponding to the to-be-trained deep learning model.

In this embodiment, the above executing body may generate the cluster resource view based on the property information of the cluster hardware resource corresponding to the to-be-trained deep learning model. Since it is possible to use a plurality of hardware devices during the distributed training on the deep learning model, and a plurality of GPUs (graphics processing units) may be set on each hardware device, the deep learning model is concurrently trained on the GPUs of the devices. There are large differences in architecture between different hardware devices, for example, there are large differences in computing power, video memory, connection mode, and bandwidth. Therefore, in this embodiment, the above executing body abstractly represents the cluster hardware resource (a processor, a switch, etc.) corresponding to the to-be-trained deep learning model, thus generating the cluster resource view.

For example, the above executing body may acquire a topological relationship between the devices, that is, a connection relationship between the devices. In addition, the above executing body acquires the processing capability information of each device, for example, the processor, video memory and bandwidth of the each device, and then generates the cluster resource view based on the topological relationship between the devices and the processing capability information of each device in the devices, thereby representing the cluster hardware resource abstractly, and realizing the shielding for specific connection modes and differences between clusters, between devices within a cluster, and within each device. Thus, various heterogeneous hardware devices and cluster environments can be supported, which reduces the difficulty of development and improves the versatility of the method.

step 203, determining a target segmentation strategy of a distributed training task based on the distributed computation view and the cluster resource view.

In this embodiment, the above executing body may determine the target segmentation strategy of the distributed training task based on the distributed computation view generated in step 201 and the cluster resource view generated in step 202. The segmentation strategy includes the segmentation approach of the deep learning model and the resource configuration approach of the cluster hardware resource. Since the overheads corresponding to different segmentation strategies are different, an optimal segmentation strategy (i.e., the target segmentation strategy) of the distributed training task is determined based on the distributed computation view and the cluster resource view in this embodiment, such that the distributed training task is split into appropriate heterogeneous hardware resource topologies to give full play to the performance of heterogeneous hardware.

For example, the training cost (overhead) of the entire computation graph under a segmentation strategy (including model segmentation and cluster resource configuration) may be estimated by modeling a cost model. Here, the training cost includes running time, storage space occupation, etc., so as to determine the optimal segmentation strategy based on the training cost corresponding to each segmentation strategy, thereby achieving the purpose of improving the training efficiency and the resource utilization rate. In addition, for a graph-level cost estimation difficulty (e.g., a communication synchronization operation, a hidden delay caused by parallelism, and a performance difference caused by heterogeneous hardware), the above executing body uses a reduction algorithm that combines dynamic information and static information, to calculate the whole graph cost (overhead), so as to ensure the accuracy of calculating the overhead.

Step 204, performing distributed training on the to-be-trained deep learning model based on the target segmentation strategy.

In this embodiment, the above executing body may perform the distributed training on the to-be-trained deep learning model based on the target segmentation strategy determined in step 203. For example, based on the target segmentation strategy, the above executing body may perform the distributed training on the to-be-trained deep learning model by adopting an asynchronous pipeline operation mechanism, which improves the concurrency rate of communication and computation to a maximum extent, thus improving the training efficiency of the distributed training. At the same time, by decoupling the sub-tasks of the distributed training, one task can run on a plurality of types of devices, and further support a plurality of execution granularities. In this way, not only different execution granularities can be set for the computing power of the heterogeneous hardware, but also control flow logic such as more complex conditions and loops can be processed, thereby improving the execution efficiency and load balancing capability.

Alternatively, during the distributed training, when detecting that an environment of the cluster hardware resource changes (e.g., a training device in the cluster fails or a device is dynamically added/deleted), the above executing body may trigger an elastic resource management mechanism for fault tolerance or elastic capacity expansion and contraction, to respond adaptively to re-determine the target segmentation strategy in the current cluster hardware environment, and may perform the distributed training based on the newly determined target segmentation strategy. As an example, when detecting a node failure, the above executing body triggers a fault tolerance mechanism to replace the faulty node with almost no interruption in training, thus saving time and resource wasted in rescheduling a resource. As another example, when detecting that the cluster resource is idle or under strain, the above executing body may perform the elastic capacity expansion and contraction, dynamically calculate and adjust a number of nodes, and perform a segmentation again as needed, thereby improving the utilization rate of the overall resource of the cluster.

According to the method for performing distributed training on a deep learning model provided by the embodiment of the present disclosure, the distributed computation view is first generated based on the data information of the to-be-trained deep learning model. Then, the cluster resource view is generated based on the property information of the cluster hardware resource corresponding to the to-be-trained deep learning model. Next, the target segmentation strategy of the distributed training task is determined based on the distributed computation view and the cluster resource view. Finally, the distributed training is performed on the to-be-trained deep learning model based on the target segmentation strategy. In the method for performing distributed training on a deep learning model in this embodiment, by generating the distributed computation view and the cluster resource view, the method can be compatible with the heterogeneous hardware and shield the difference between different hardware. Moreover, by determining the target segmentation strategy, the distributed training task can be split onto an appropriate heterogeneous hardware resource to give full play to the performance of the heterogeneous hardware, thus improving the efficiency of performing the distributed training on the to-be-trained deep learning model based on the target segmentation strategy.

In the technical solution of the present disclosure, the collection, storage, use, processing, transmission, provision, disclosure, etc. of the personal information of a user all comply with the provisions of the relevant laws and regulations, and do not violate public order and good customs.

Figure 3:
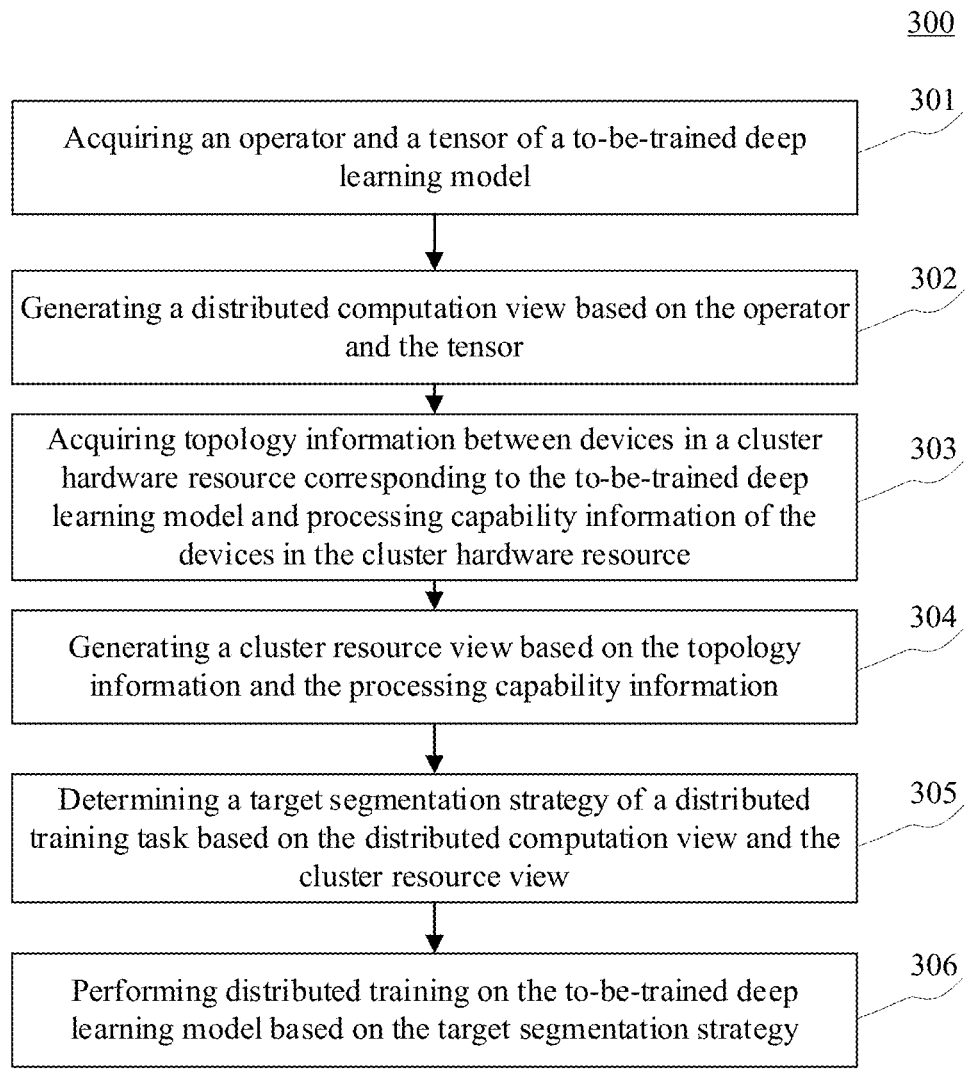
FIG. 3 is a flowchart of the method for performing distributed training on a deep learning model according to another embodiment of the present disclosure.

Further referring to FIG. 3, FIG. 3 illustrates a flow 300 of the method for performing distributed training on a deep learning model according to another embodiment of the present disclosure. The method for performing distributed training on a deep learning model includes the following steps.

Step 301, acquiring an operator and a tensor of a to-be-trained deep learning model.

In this embodiment, an executing body (e.g., the server 105 shown in FIG. 1) of the method for performing distributed training on a deep learning model may acquire the operator and tensor of the to-be-trained deep learning model. The computation at a node in a computational data-flow graph is called an operator, and each edge represents a tensor transferred between nodes. As long as each operator and tensor are represented in parallel, the entire neural network can be parallelized, and thus can be converted from a sequentially executed computation graph to a distributed computation graph. Therefore, the above executing body will first acquire the operator and the tensor of the to-be-trained deep learning model.

In some alternative implementations of this embodiment, after step 301, the method for performing distributed training on a deep learning model further includes: acquiring a distributed property of the operator and a distributed property of the tensor. Since each operator and tensor can carry their respective distributed property, the executing body may further acquire the distributed property of the operator and the distributed property of the tensor. Here, the distributed properties include, but not limited to, logical process topology information, segmentation mapping information of each dimension of the tensor, slice size information of the each dimension of the tensor, and slice physical device placement information. It should be noted that the distributed property of a tensor may be different from the distributed property corresponding to the operator using the tensor, which is conducive to the separation of storage and computation.

Step 302, generating a distributed computation view based on the operator and the tensor.

In this embodiment, the above executing body may generate the distributed computation view based on the operator and the tensor. The generated distributed computation view decouples a distributed operator from a distributed tensor, to better expand to different parallel strategies.

In some alternative implementations of this embodiment, step 302 includes: generating the distributed computation view based on the operator, the distributed property of the operator, the tensor, and the distributed property of the tensor. After acquiring the distributed property of the operator and the distributed property of the tensor, the executing body generates the distributed computation view based on the operator, the distributed property of the operator, the tensor, and the distributed property of the tensor. Accordingly, the comprehensiveness and accuracy of the distributed computation view are ensured.

In some alternative implementations of this embodiment, the method for performing distributed training on a deep learning model further includes: inserting, in response to detecting that a definition for an input tensor and an output tensor in the distributed computation view does not match a definition for an operator using the input tensor and the output tensor, a recombination transformation operator; and inserting, in response to detecting that a device corresponding to the input tensor and the output tensor in the distributed computation view is inconsistent with a device corresponding to the operator using the input tensor and the output tensor, a communication operator.

In the implementations, when the definitions of the input and output tensors do not match the definition of the operator, the recombination transformation operator will be automatically inserted, thereby ensuring the correctness of the computation. When the device of the input and output tensors is inconsistent with the device of the operator, the communication operator will be automatically inserted, to ensure the correctness of cross-device segmentation.

Step 303, acquiring topology information between devices in a cluster hardware resource corresponding to the to-be-trained deep learning model and processing capability information of the devices in the cluster hardware resource.

In this embodiment, since the cluster hardware resource corresponding to the to-be-trained deep learning model may include a plurality of devices, the executing body may acquire the topology information between the devices in the cluster hardware resource (i.e., connection mode information between the devices). The executing body may further acquire the processing capability information of the devices in the cluster hardware resource. Here, the processing capability information includes, but not limited to, the processor information, bandwidth information and video memory information of the device.

Step 304, generating a cluster resource view based on the topology information and the processing capability information.

In this embodiment, the above executing body may generate the cluster resource view based on the topology information between the devices and the processing capability information of each device that are acquired in step 303. The cluster resource view represents the cluster hardware resource abstractly, thereby realizing the shielding for specific connection modes and differences between clusters, between devices within a cluster, and within each device. Thus, various heterogeneous hardware devices and cluster environments can be supported, which reduces the difficulty of development and improves the versatility of the method.

Step 305, determining a target segmentation strategy of a distributed training task based on the distributed computation view and the cluster resource view.

Step 306, performing distributed training on the to-be-trained deep learning model based on the target segmentation strategy.

Steps 305-306 are basically the same as steps 203-204 in the foregoing embodiment. For the specific implementations, reference may be made to the foregoing descriptions of steps 203-204, and thus the details will not be repeatedly described here.

It can be seen from FIG. 3 that, as compared with the embodiment corresponding to FIG. 2, the method for performing distributed training on a deep learning model in this embodiment emphasizes the process of generating the distributed computation view and the process of generating the cluster resource view. By decoupling the operator from the tensor, and representing the processing capability and topological relationship of the hardware device abstractly, the logical segmentation is decoupled from the hardware resource, which realizes the compatibility with the heterogeneous hardware, thus improving the expandability and maintainability of the distributed training method.

Figure 4:
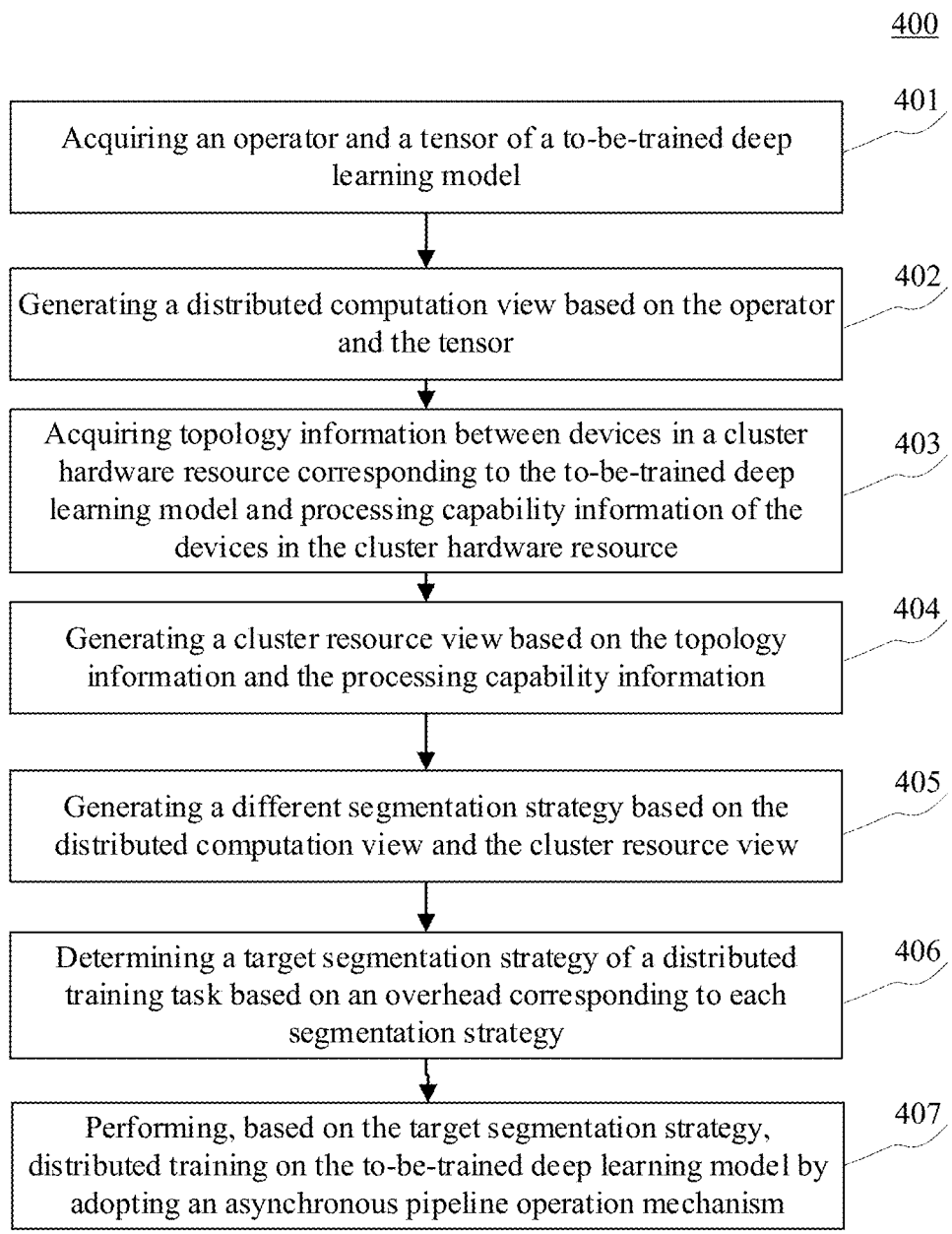
FIG. 4 is a flowchart of the method for performing distributed training on a deep learning model according to another embodiment of the present disclosure.

Further referring to FIG. 4, FIG. 4 illustrates a flow 400 of the method for performing distributed training on a deep learning model according to another embodiment of the present disclosure. The method for performing distributed training on a deep learning model includes the following steps.

Step 401, acquiring an operator and a tensor of a to-be-trained deep learning model.

Step 402, generating a distributed computation view based on the operator and the tensor.

Step 403, acquiring topology information between devices in a cluster hardware resource corresponding to the to-be-trained deep learning model and processing capability information of the devices in the cluster hardware resource.

Step 404, generating a cluster resource view based on the topology information and the processing capability information.

Steps 401-404 are basically the same as steps 301-304 in the foregoing embodiment. For the specific implementations, reference may be made to the foregoing descriptions of steps 301-304, and thus the details will not be repeatedly described here.

Step 405, generating a different segmentation strategy based on the distributed computation view and the cluster resource view.

In this embodiment, an executing body (e.g., the server 105 shown in FIG. 1) of the method for performing distributed training on a deep learning model may generate the different segmentation strategy based on the distributed computation view and the cluster resource view. Here, the segmentation strategy includes a segmentation approach of the deep learning model and a resource configuration approach of the cluster hardware resource. That is, the above executing body determines different model segmentation approaches and different resource configuration approaches, and combine each model segmentation approach and each resource configuration approach to obtain different segmentation strategies.

Step 406, determining a target segmentation strategy of a distributed training task based on an overhead corresponding to each segmentation strategy.

In this embodiment, the executing body may determine the target segmentation strategy (i.e., optimal segmentation strategy) of the distributed training task based on the overhead corresponding to the each segmentation strategy. For example, the executing body respectively calculates the overhead corresponding to each kind of segmentation strategy, and then determines the segmentation strategy with a minimum overhead as the optimal segmentation strategy, that is, the target segmentation strategy. Thus, the training efficiency when the training is performed based on the target segmentation strategy is improved.

In some alternative implementations of this embodiment, step 406 includes: calculating the overhead corresponding to the each segmentation strategy, the overhead including a running time overhead and a storage space occupation overhead, and the running time overhead including an operator overhead and a communication overhead; and determining a segmentation strategy with a minimum overhead as the target segmentation strategy of the distributed training task.

In the implementations, the above executing body may respectively calculate the running time overheads and storage space occupation overheads of various segmentation strategies, to respectively obtain the overhead values corresponding to the various segmentation strategies. Here, a running time overhead further include an operator overhead and a communication overhead. Then, the executing body may determine a segmentation strategy with a minimum overhead value as the optimal segmentation strategy (e.g., the target segmentation strategy) of the distributed training task. Thus, the distributed training task is split onto an appropriate heterogeneous hardware resource to give full play to the performance of the heterogeneous hardware, and the usability and training efficiency of the distributed training method are improved.

Step 407, performing, based on the target segmentation strategy, distributed training on the to-be-trained deep learning model by adopting an asynchronous pipeline operation mechanism.

In this embodiment, based on the target segmentation strategy determined in step 406, the executing body may perform the distributed training on the to-be-trained deep learning model by adopting the asynchronous pipeline operation mechanism, which improves the concurrency rate of communication and computation to a maximum extent, thus improving the training efficiency of the distributed training. At the same time, for the problem that it is difficult to debug in an asynchronous process, the executing body can solve the problem through an operation such as an operation of aligning the precisions of a sequentially executed serial computation graph and the distributed computation graph. During running, the executing body can further select an optimal communication algorithm according to hardware topology information, thus improving the communication efficiency.

In some alternative implementations of this embodiment, the method for performing distributed training on a deep learning model further includes: triggering, during the distributed training, an elastic resource management mechanism in response to that an environment of the cluster hardware resource changes, to re-determine the target segmentation strategy.

In the implementations, when a training device in the cluster fails or a device is dynamically added/deleted, the executing body triggers an elastic resource management mechanism for fault tolerance or elastic capacity expansion and contraction, to respond adaptively to re-determine the target segmentation strategy in the current cluster hardware environment, and performs the distributed training based on the newly determined target segmentation strategy. As an example, when detecting a node failure, the executing body triggers a fault tolerance mechanism to replace the faulty node with almost no interruption in training, thus saving time and resource wasted in rescheduling a resource. As another example, when detecting that the cluster resource is idle or under strain, the above executing body may perform the elastic capacity expansion and contraction, dynamically calculate and adjust a number of nodes, and perform a segmentation again as needed, thereby improving the utilization rate of the overall resource of the cluster.

It can be seen from FIG. 4 that, as compared with the embodiment corresponding to FIG. 3, the method for performing distributed training on a deep learning model in this embodiment emphasizes the process of determining the target segmentation strategy and the process of performing the distributed training. Accordingly, the distributed training task can be split onto an appropriate heterogeneous hardware resource to give full play to the performance of the heterogeneous hardware, thus improving the usability of the distributed training method, and the training efficiency is improved by adopting the asynchronous pipeline operation mechanism. In addition, the method supports the automatic elastic adjustment for hardware resource used for the training during the training process, which improves the robustness of the training method and the utilization rate of the hardware resource.

Figure 5:
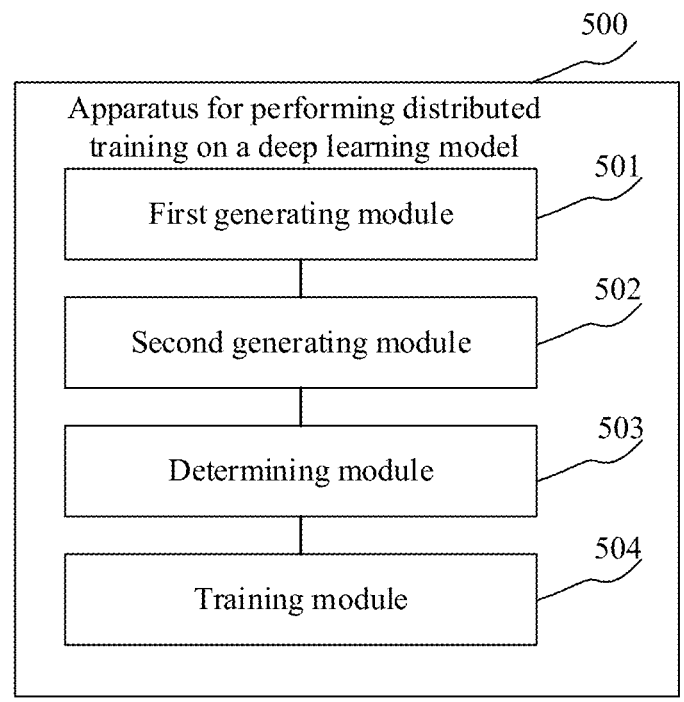
FIG. 5 is a schematic structural diagram of an apparatus for performing distributed training on a deep learning model according to an embodiment of the present disclosure.

Further referring to FIG. 5, as an implementation of the method shown in the above drawings, an embodiment of the present disclosure provides an apparatus for performing distributed training on a deep learning model. The embodiment of the apparatus corresponds to the embodiment of the method shown in FIG. 2. The apparatus may be applied in various electronic devices.

As shown in FIG. 5, the apparatus 500 for performing distributed training on a deep learning model in this embodiment includes: a first generating module 501, a second generating module 502, a determining module 503 and a training module 504. Here, the first generating module 501 is configured to generate a distributed computation view based on data information of a to-be-trained deep learning model. The second generating module 502 is configured to generate a cluster resource view based on property information of a cluster hardware resource corresponding to the to-be-trained deep learning model. The determining module 503 is configured to determine a target segmentation strategy of a distributed training task based on the distributed computation view and the cluster resource view. The training module 504 is configured to perform distributed training on the to-be-trained deep learning model based on the target segmentation strategy.

In this embodiment, for specific processes of the first generating module 501, the second generating module 502, the determining module 503 and the training module 504 in the apparatus 500 for performing distributed training on a deep learning model, and their technical effects, reference may be respectively made to relative descriptions of steps 201-204 in the corresponding embodiment of FIG. 2, and thus the details will not be repeatedly described here.

In some alternative implementations of this embodiment, the first generating module includes: a first acquiring submodule, configured to acquire an operator and a tensor of a to-be-trained deep learning model; and a first generating submodule, configured to generate the distributed computation view based on the operator and the tensor.

In some alternative implementations of this embodiment, the first generating module further includes: a second acquiring submodule, configured to acquire a distributed property of the operator and a distributed property of the tensor. The first generating submodule includes: a generating unit, configured to generate the distributed computation view based on the operator, the distributed property of the operator, the tensor, and the distributed property of the tensor.

In some alternative implementations of this embodiment, the apparatus for performing distributed training on a deep learning model further includes: a first inserting module, configured to insert, in response to detecting that a definition for an input tensor and an output tensor in the distributed computation view does not match a definition for an operator using the input tensor and the output tensor, a recombination transformation operator; and a second inserting module, configured to insert, in response to detecting that a device corresponding to the input tensor and the output tensor in the distributed computation view is inconsistent with a device corresponding to the operator using the input tensor and the output tensor, a communication operator.

In some alternative implementations of this embodiment, the second generating module includes: a third acquiring submodule, configured to acquire topology information between devices in the cluster hardware resource corresponding to the to-be-trained deep learning model and processing capability information of the devices in the cluster hardware resource, the processing capability information including at least one of processor information, bandwidth information, or video memory information; and a second generating submodule, configured to generate the cluster resource view based on the topology information and the processing capability information.

In some alternative implementations of this embodiment, the determining module includes: a third generating submodule, configured to generate a different segmentation strategy based on the distributed computation view and the cluster resource view, the segmentation strategy including a segmentation approach of the deep learning model and a resource configuration approach of the cluster hardware resource; and a determining submodule, configured to determine the target segmentation strategy of the distributed training task based on an overhead corresponding to each segmentation strategy.

In some alternative implementations of this embodiment, the determining submodule includes: a calculating unit, configured to calculate the overhead corresponding to the each segmentation strategy, where the overhead includes a running time overhead and a storage space occupation overhead, and the running time overhead comprises an operator overhead and a communication overhead; and a determining unit, configured to determine a segmentation strategy with a minimum overhead as the target segmentation strategy of the distributed training task.

In some alternative implementations of this embodiment, the training module includes: a training submodule, configured to perform, based on the target segmentation strategy, the distributed training on the to-be-trained deep learning model by adopting an asynchronous pipeline operation mechanism.

In some alternative implementations of this embodiment, the apparatus for performing distributed training on a deep learning model further includes: a triggering module, configured to trigger, during the distributed training, an elastic resource management mechanism in response to an environment of the cluster hardware resource changing, to re-determine the target segmentation strategy.

According to an embodiment of the present disclosure, the present disclosure further provides an electronic device, a readable storage medium and a computer program product.

Figure 6:
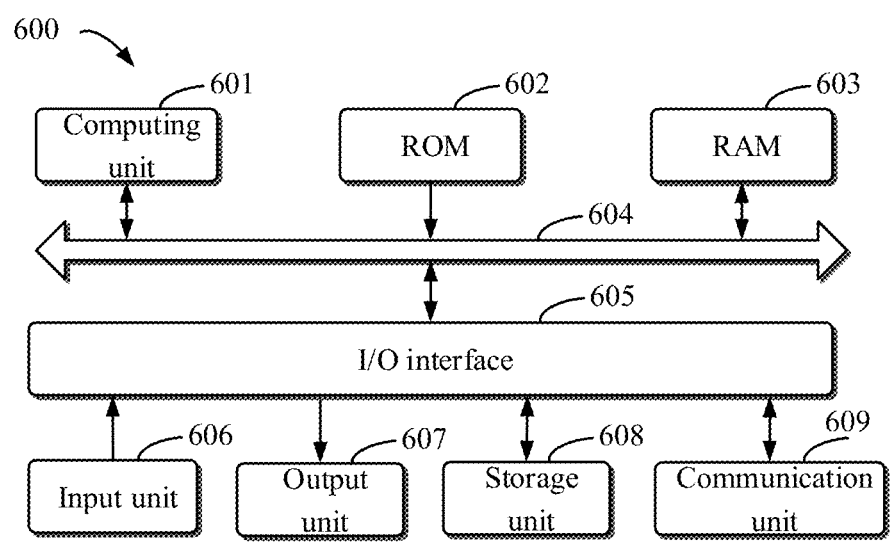
FIG. 6 is a block diagram of an electronic device used to implement the method for performing distributed training on a deep learning model according to embodiments of the present disclosure.

FIG. 6 is a schematic block diagram of an example electronic device 600 that may be used to implement the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processing, a cellular telephone, a smart phone, a wearable device and other similar computing apparatuses. The parts shown herein, their connections and relationships, and their functions are only as examples, and not intended to limit the implementations of the present disclosure as described and/or claimed herein.

As shown in FIG. 6, the electronic device 600 includes a computing unit 601, which may execute various appropriate actions and processes in accordance with a computer program stored in a read-only memory (ROM) 602 or a computer program loaded into a random access memory (RAM) 603 from a storage unit 608. The RAM 603 also stores various programs and data required by operations of the device 600. The computing unit 601, the ROM 602 and the RAM 603 are connected to each other through a bus 604. An input/output (I/O) interface 605 is also connected to the bus 604.

The following components in the electronic device 600 are connected to the I/O interface 605: an input unit 606, for example, a keyboard and a mouse; an output unit 607, for example, various types of displays and a speaker; a storage unit 608, for example, a magnetic disk and an optical disk; and a communication unit 609, for example, a network card, a modem, a wireless communication transceiver. The communication unit 609 allows the device 600 to exchange information/data with an other device through a computer network such as the Internet and/or various telecommunication networks.

The computing unit 601 may be various general-purpose and/or special-purpose processing assemblies having processing and computing capabilities. Some examples of the computing unit 601 include, but not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. The computing unit 601 performs the various methods and processes described above, for example, the method for performing distributed training on a deep learning model. For example, in some embodiments, the method for performing distributed training on a deep learning model may be implemented as a computer software program, which is tangibly included in a machine readable medium, for example, the storage unit 608. In some embodiments, part or all of the computer program may be loaded into and/or installed on the device 600 via the ROM 602 and/or the communication unit 609. When the computer program is loaded into the RAM 603 and executed by the computing unit 601, one or more steps of the above method for testing a stress based on a cloud service may be performed. Alternatively, in other embodiments, the computing unit 601 may be configured to perform the method for performing distributed training on a deep learning model through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, a distributed system server, or a server combined with a blockchain.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A computer-implemented method for performing distributed training on a deep learning model, comprising:
generating, by computer, a distributed computation view based on data information from a data flow graph of a to-be-trained deep learning model, comprising
acquiring an operator and a tensor of a to-be-trained deep learning model,
acquiring a distributed property of the operator and a distributed property of the tensor, and
generating the distributed computation view based on the operator, the distributed property of the operator, the tensor, and the distributed property of the tensor, wherein the distributed properties comprise at least: logical process topology information, segmentation mapping information of each dimension of the tensor, slice size information of the each dimension of the tensor, and slice physical device placement information;

generating, by computer, a cluster resource view based on property information of a cluster hardware resource corresponding to the to-be-trained deep learning model;

determining, by computer, a target segmentation strategy of a distributed training task based on the distributed computation view and the cluster resource view, comprising:

generating a different segmentation strategy based on the distributed computation view and the cluster resource view, the segmentation strategy comprising a segmentation approach of the deep learning model and a resource configuration approach of the cluster hardware resource, calculating an overhead corresponding to each segmentation strategy, wherein the overhead comprises a running time overhead and a storage space occupation overhead, and the running time overhead comprises an operator overhead and a communication overhead, determining a segmentation strategy with a minimum overhead as the target segmentation strategy of the distributed training task; and performing, by computer, distributed training on the to-be-trained deep learning model based on the target segmentation strategy.

2. The method according to claim 1, further comprising:
inserting, in response to detecting that a definition for an input tensor and an output tensor in the distributed computation view does not match a definition for an operator using the input tensor and the output tensor, a recombination transformation operator; and inserting, in response to detecting that a device corresponding to the input tensor and the output tensor in the distributed computation view is not the same as a device corresponding to the operator using the input tensor and the output tensor, a communication operator.

3. The method according to claim 1, wherein generating a cluster resource view based on property information of a cluster hardware resource corresponding to the to-be-trained deep learning model comprises:

acquiring topology information between devices in the cluster hardware resource corresponding to the to-be-trained deep learning model and processing capability information of the devices in the cluster hardware resource, the processing capability information comprising at least one of: processor information, bandwidth information, or video memory information; and generating the cluster resource view based on the topology information and the processing capability information.

4. The method according to claim 1, wherein performing distributed training on the to-be-trained deep learning model based on the target segmentation strategy comprises:

performing, based on the target segmentation strategy, the distributed training on the to-be-trained deep learning model by using an asynchronous pipeline operation mechanism.

5. The method according to claim 4, further comprising:
triggering, during the distributed training, an elastic resource management mechanism in response to an environment of the cluster hardware resource changing, to re-determine the target segmentation strategy.

6. The method according to claim 1, wherein the distributed property of a tensor is different from the distributed property corresponding to the operator using the tensor.

7. The method according to claim 1, wherein calculating an overhead corresponding to each segmentation strategy further comprises using a reduction algorithm combining dynamic information and static information to calculate the overhead.

8. The method according to claim 1, wherein the information of a cluster hardware resource comprises information of heterogenous devices in the cluster.

9. An electronic device, comprising:
at least one processor; and
a memory, communicatively connected with the at least one processor,
wherein the memory stores an instruction executable by the at least one processor, and the instruction when executed by the at least one processor, causes the at least one processor to perform operations, the operations comprising:

generating a distributed computation view based on data information from a data flow graph of a to-be-trained deep learning model, comprising:
acquiring an operator and a tensor of a to-be-trained deep learning model,
acquiring a distributed property of the operator and a distributed property of the tensor, and
generating the distributed computation view based on the operator, the distributed property of the operator, the tensor, and the distributed property of the tensor, wherein the distributed properties comprise at least: logical process topology information, segmentation mapping information of each dimension of the tensor, slice size information of the each dimension of the tensor, and slice physical device placement information;

generating a cluster resource view based on property information of a cluster hardware resource corresponding to the to-be-trained deep learning model;

determining a target segmentation strategy of a distributed training task based on the distributed computation view and the cluster resource view, comprising:
generating a different segmentation strategy based on the distributed computation view and the cluster resource view, the segmentation strategy comprising a segmentation approach of the deep learning model and a resource configuration approach of the cluster hardware resource,
calculating an overhead corresponding to each segmentation strategy, wherein the overhead comprises a running time overhead and a storage space occupation overhead, and the running time overhead comprises an operator overhead and a communication overhead,
determining a segmentation strategy with a minimum overhead as the target segmentation strategy of the distributed training task; and performing distributed training on the to-be-trained deep learning model based on the target segmentation strategy.

10. The electronic device according to claim 9, wherein the operations further comprise:
inserting, in response to detecting that a definition for an input tensor and an output tensor in the distributed computation view does not match a definition for an operator using the input tensor and the output tensor, a recombination transformation operator; and
inserting, in response to detecting that a device corresponding to the input tensor and the output tensor in the distributed computation view is not the same as a device corresponding to the operator using the input tensor and the output tensor, a communication operator.

11. The electronic device according to claim 9, wherein generating a cluster resource view based on property information of a cluster hardware resource corresponding to the to-be-trained deep learning model comprises:
acquiring topology information between devices in the cluster hardware resource corresponding to the to-be-trained deep learning model and processing capability information of the devices in the cluster hardware resource, the processing capability information comprising at least one of: processor information, bandwidth information, or video memory information; and
generating the cluster resource view based on the topology information and the processing capability information.

12. The electronic device according to claim 9, wherein performing distributed training on the to-be-trained deep learning model based on the target segmentation strategy comprises:
performing, based on the target segmentation strategy, the distributed training on the to-be-trained deep learning model by using an asynchronous pipeline operation mechanism.

13. The electronic device according to claim 12, wherein the operations further comprise:
triggering, during the distributed training, an elastic resource management mechanism in response to an environment of the cluster hardware resource changing, to re-determine the target segmentation strategy.

14. The electronic device according to claim 9, wherein the distributed property of a tensor is different from the distributed property corresponding to the operator using the tensor.

15. The electronic device according to claim 9, wherein calculating an overhead corresponding to each segmentation strategy further comprises using a reduction algorithm combining dynamic information and static information to calculate the overhead.

16. The electronic device according to claim 9, wherein the distributed property of a tensor is different from the distributed property corresponding to the operator using the tensor.

17. A non-transitory computer readable storage medium, storing a computer instruction, wherein the computer instruction when executed by a processor, causes the processor to perform operations, the operations comprising:
generating, by the processor, a distributed computation view based on data information from a data flow graph of a to-be-trained deep learning model, comprising
acquiring, by the processor, an operator and a tensor of a to-be-trained deep learning model,
acquiring, by the processor, a distributed property of the operator and a distributed property of the tensor, and
generating, by the processor, the distributed computation view based on the operator, the distributed property of the operator, the tensor, and the distributed property of the tensor, wherein the distributed properties comprise at least: logical process topology information, segmentation mapping information of each dimension of the tensor, slice size information of the each dimension of the tensor, and slice physical device placement information;
generating, by the processor, a cluster resource view based on property information of a cluster hardware resource corresponding to the to-be-trained deep learning model;
determining, by the processor, a target segmentation strategy of a distributed training task based on the distributed computation view and the cluster resource view, comprising:
generating, by the processor, a different segmentation strategy based on the distributed computation view and the cluster resource view, the segmentation strategy comprising a segmentation approach of the deep learning model and a resource configuration approach of the cluster hardware resource,
calculating, by the processor, an overhead corresponding to each segmentation strategy, wherein the overhead comprises a running time overhead and a storage space occupation overhead, and the running time overhead comprises an operator overhead and a communication overhead,
determining, by the processor, a segmentation strategy with a minimum overhead as the target segmentation strategy of the distributed training task; and
performing, by the processor, distributed training on the to-be-trained deep learning model based on the target segmentation strategy.

* * * * *